United States Patent
Zhang (10) Patent No.: US 11,463,493 B2
(45) Date of Patent: Oct. 4, 2022

(54) METHOD AND APPARATUS FOR PLAYING MEDIA FILE

(71) Applicant: AutoChips Inc., Hefei (CN)

(72) Inventor: Biao Zhang, Hefei (CN)

(73) Assignee: AUTOCHIPS INC., Hefei (CN)

( * ) Notice: Subject to any disclaimer, the term of this patent is extended or adjusted under 35 U.S.C. 154(b) by 116 days.

(21) Appl. No.: 16/438,488

(22) Filed: Jun. 12, 2019

(65) Prior Publication Data

US 2020/0145470 A1    May 7, 2020

(30) Foreign Application Priority Data

Nov. 7, 2018    (CN) .......................... 201811320041.3

(51) Int. Cl.
- *H04L 65/60* (2022.01)
- *G06F 16/438* (2019.01)
- *H04L 43/08* (2022.01)

(52) U.S. Cl.
CPC ............ *H04L 65/60* (2013.01); *G06F 16/438* (2019.01); *H04L 43/08* (2013.01)

(58) Field of Classification Search
None
See application file for complete search history.

(56) References Cited

U.S. PATENT DOCUMENTS

| | | | |
|---|---|---|---|
| 10,178,043 B1* | 1/2019 | Ganjam | H04L 47/801 |
| 10,277,928 B1* | 4/2019 | Joliveau | H04N 21/26258 |
| 2013/0163430 A1* | 6/2013 | Gell | H04L 47/11 370/235 |
| 2016/0345074 A1* | 11/2016 | Serbest | H04L 67/306 |
| 2016/0353148 A1* | 12/2016 | Prins | H04N 21/6175 |
| 2018/0337972 A1* | 11/2018 | Lepeska | H04L 67/2842 |

FOREIGN PATENT DOCUMENTS

| | | |
|---|---|---|
| CN | 104125229 A | 10/2014 |
| CN | 104244069 A | 12/2014 |
| CN | 104304475 A | 3/2015 |
| CN | 104661088 A | 5/2015 |
| CN | 105472443 A | 4/2016 |

OTHER PUBLICATIONS

Chinese First Office Action, Chinese Application No. 201811320041.3, dated Jul. 22, 2020 (12 pages).
Chinese Second Office Action, Chinese Application No. 201811320041.3, dated Feb. 20, 2021 (10 pages).

* cited by examiner

*Primary Examiner* — Kevin T Bates
*Assistant Examiner* — Dae Kim (57) ABSTRACT

A method and apparatus for playing a media file are disclosed. The method includes determining whether a resource-substitution process needs to be performed; and selecting a substitute resource from a candidate resource set to replace an original resource in the media file to play, when the resource-substitution process needs to be performed.

12 Claims, 5 Drawing Sheets

METHOD AND APPARATUS FOR PLAYING MEDIA FILE

CROSS-REFERENCE TO RELATED APPLICATIONS

This application claims a priority to Chinese Patent Application No. 201811320041.3, filed on Nov. 7, 2018, the content of which is herein incorporated by reference in its entirety.

TECHNICAL FIELD

Embodiments of the present disclosure relate to a field of multimedia technology, more particularly, to a method and an apparatus for playing media files.

BACKGROUND

During playing of media files such as audio or video, there may be a situation that the audio or video in the file will not be supported by a playing platform, or the playing platform supports it but the playing quality is low, for example, involving a poor audio quality, a low video resolution, an unsmooth playing, and a data error, etc.

Figure 1:
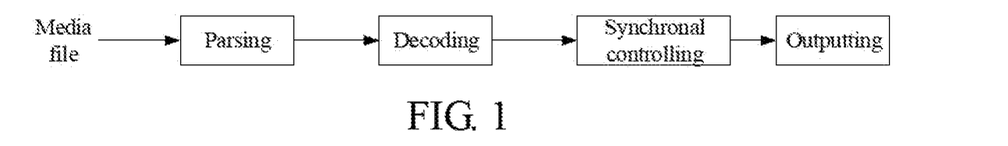
FIG. 1 is a flow chart of a conventional processing for playing a media file.

As shown in FIG. 1, a conventional processing for playing media files includes parsing, decoding, synchronal controlling, and outputting. Herein, parsing and decoding can be completed by software components and hardware components, and decoding includes video decoding and audio decoding. Synchronal controlling is completed by software, to synchronize sounds and pictures of the decoded video and audio. The outputting is completed by an output device, such as a display device and a sound output device. In this conventional playing process, playing may not continue when an unsupported media file appears, or playing may still continue even when the playing quality of the supported media file is low. As can be seen, when the above situation happens, the playing effect is poor, and the user experience is frustrating.

DETAILED DESCRIPTION

In order that one skilled in the art may have a better understanding of technical solutions in the present disclosure, the technical solutions of the present disclosure are further described in detail below in combination with the accompanying drawings and specific embodiments.

Figure 2:
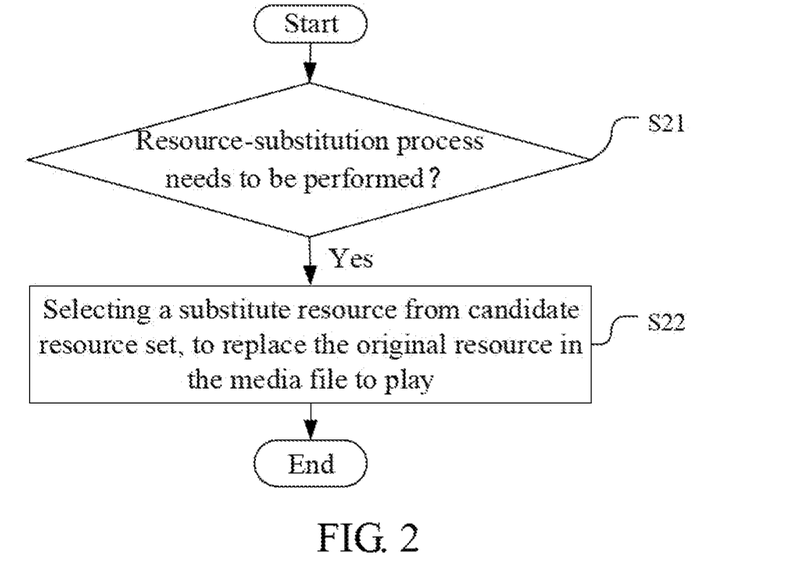
FIG. 2 is a flow chart of a method for playing a media file in accordance with a first embodiment of the present disclosure.

As shown in FIG. 2, FIG. 2 is a flow chart of a method for playing a media file according to a first embodiment of the present disclosure. The method can be implemented on a terminal. The terminal can be a mobile terminal, such as a smart phone, a tablet, etc., or can be a fixed terminal, such as a computer, a server, or the like. The method includes actions/operations in the following blocks.

At block S21, the method includes determining whether resource-substitution process needs to be performed.

The resource-substitution process can be triggered by an event. A triggering event for resource-substitution process can be referred to as a resource-substitution process triggering event. The resource-substitution process triggering event may include that a preset condition is not satisfied, such as, a score of an original resource in a current media file is less than a threshold score, and the current media file does not have a good playing effect, for example, an error occurs during playing audio or video in the current media file, the audio or video in the current media file does not display smoothly, etc. The resource-substitution process triggering event may also include a receipt of a user instruction, for example, the user determines that a resource-substitution process needs to be performed by himself.

At block S22, the method includes selecting a substitute resource from a candidate resource set to replace an original resource in the media file to play, when the resource-substitution process needs to be performed.

When the resource-substitution process triggering event occurs, the substitute resource is selected from the candidate resource set to play, instead of playing the original resource in the media file. Herein, the substitute resource selected from the candidate resource set is the resource with the highest score in the candidate resource set. The substitute resource may include video resource, and/or audio resource, and/or subtitle resource. For example, when the current media file has a video resolution lower than a specific value, the resource-substitution process trigger event occurs, and a video resource is selected from the candidate resource set to replace the original video resource of the current media file, so that the video resource may replace the original video resource to perform a substituted playing.

The candidate resource set includes a plurality of resources that have contents the same as the original resource and a score higher than the original resource. The candidate resource set may be predefined. Or the candidate resource set may be established or updated through resource-detection process when block S22 is performed.

Block S21 can be performed in the process of playing the media file. In this case, when the resource-substitution process does not need to be performed, the processing flow in FIG. 1 is adopted to continue the playing of the media file. Block S21 can also be performed before the media file is played, that is, when the media file has not yet played, block S21 is performed. In this case, when the resource-substitution process does not need to be performed, the media file is directly played through the processing flow in FIG. 1.

According to the above embodiment, when there is a problem occurred during the playing of the current media file, the substitute resource is selected from the candidate resource set to replace the original resource to play, thus the playing of the current media file may be effectively improved in real time, and a better playing effect may be maintained, without changing the hardware components and software components to play media files.

Figure 3:
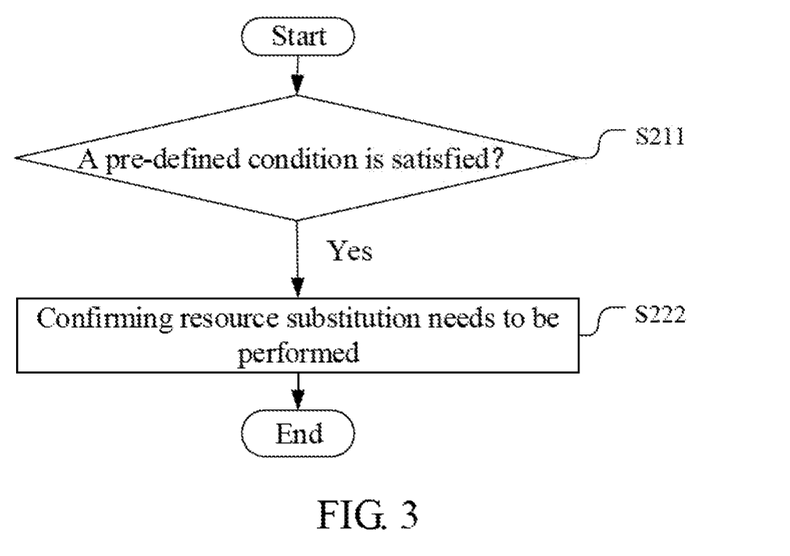
FIG. 3 is a flow chart of a method for playing a media file in accordance with a second embodiment of the present disclosure.

As shown in FIG. 3, FIG. 3 is a flow chart of a method for playing a media file according to a second embodiment of the present disclosure. On the basis of the first embodiment of the method for playing a media file, block S21 may include actions/operations in the following blocks.

At block S211, the method includes determining whether a predefined condition is satisfied.

The predefined condition may include whether the score of the original resource is lower than a threshold score and/or whether the original resource involves a playing anomaly. In one example, the predefined condition is that the score of the audio is lower than the threshold score, indicating that the sound quality of the media file is poor. In another example, the predefined condition may be a receipt of a user instruction.

The score of the original resource is achieved by scoring the original resource according to the original resource itself and whether the platform supports the parsing, decoding or outputting of the original resource. In one example, the media file may be scored before block S211. Specifically, each parsed resource is scored according to each resource itself and whether the platform supports the parsing, decoding, or outputting of each resource. Related details refer to the following embodiments and will not be recited herein.

The playing anomaly includes any one of the following cases that a running error of the resource affects the playing, a processing error rate of the resource is greater than or equal to a predefined value, a data consumption rate fluctuation of the resource is greater than or equal to a predefined value, and a data output rate of the resource is inconsistent with a rate calculated according to a playing speed. Herein, the processing error rate of the resource is greater than or equal to the predefined value, indicating that there are many errors in the media file. The data consumption rate fluctuation of the resource is greater than or equal to the predefined value, indicating that the outputting is not smooth. If the data output rate of the resource is inconsistent with the rate calculated according to the playing speed when the outputting is smooth, it means that the playing is too slow or too fast.

At block S212, the method includes confirming that the resource-substitution process needs to be performed, when the predefined condition is satisfied.

When the predefined condition is satisfied, for example, the score of the original resource is lower than the threshold score or a playing anomaly occurs in the original resource, or, the score of the original resource is lower than the threshold score and a playing anomaly occurs in the original resource, the resource-substitution process trigger event occurs, and the resource-substitution process needs to be performed to perform a substituted playing.

Figure 4:
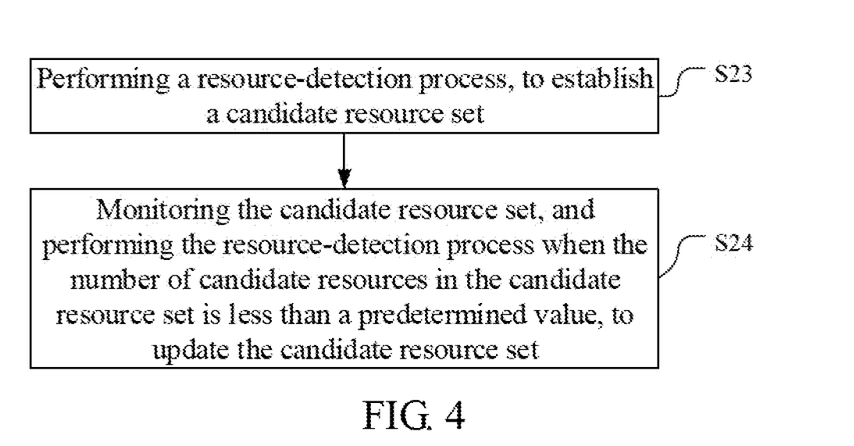
FIG. 4 is a flow chart of a method for playing a media file in accordance with a third embodiment of the present disclosure.

As shown in FIG. 4, FIG. 4 is a flow chart of a method for playing a media file according to a third embodiment of the present disclosure. On the basis of the method for playing a media file in the foregoing embodiments, the method may further include actions/operations in the following blocks.

At block S23, the method includes performing resource-detection process to establish the candidate resource set.

The resource-detection process can be performed in the background. For different resources, the resource-detection process is performed independently. For example, the detection of audio, detection of video and detection of subtitles are performed independently from each other.

This block S23 may be performed before block S21, or may be performed when block S22 is performed.

At block S24, the method includes monitoring the candidate resource set, and performing the resource-detection process when the number of candidate resources in the candidate resource set is less than a predetermined value, to update the candidate resource set.

Monitoring the candidate resource set includes monitoring the number of candidate resources in the candidate resource set and/or monitoring a validity of the candidate resource in the candidate resource set. The monitoring of candidate resource sets can be performed once at intervals.

When the number of candidate resources in the candidate resource set is less than the predetermined value, the resource-detection process is performed to update the candidate resource set. When the number of candidate resources reaches the predetermined value, the resource-detection process is stopped. In one example, monitoring the validity of the candidate resource in the candidate resource set includes monitoring whether the candidate resource is removed from the candidate resource set or not. If a candidate resource has been removed from the candidate resource set, the number of candidate resources is reduced, and the resource-detection process is performed, and the removed candidate resource is added to a candidate resource blacklist.

It should be noted that the order of block S23 and block S24 is merely illustrative and it is not necessary to execute in this order, for example, block S23 and block S24 may be executed simultaneously.

According to the present embodiment, the candidate resource set is established and updated through the resource-detection process, and the candidate resource set is kept valid by monitoring the candidate resource set.

Figure 5:
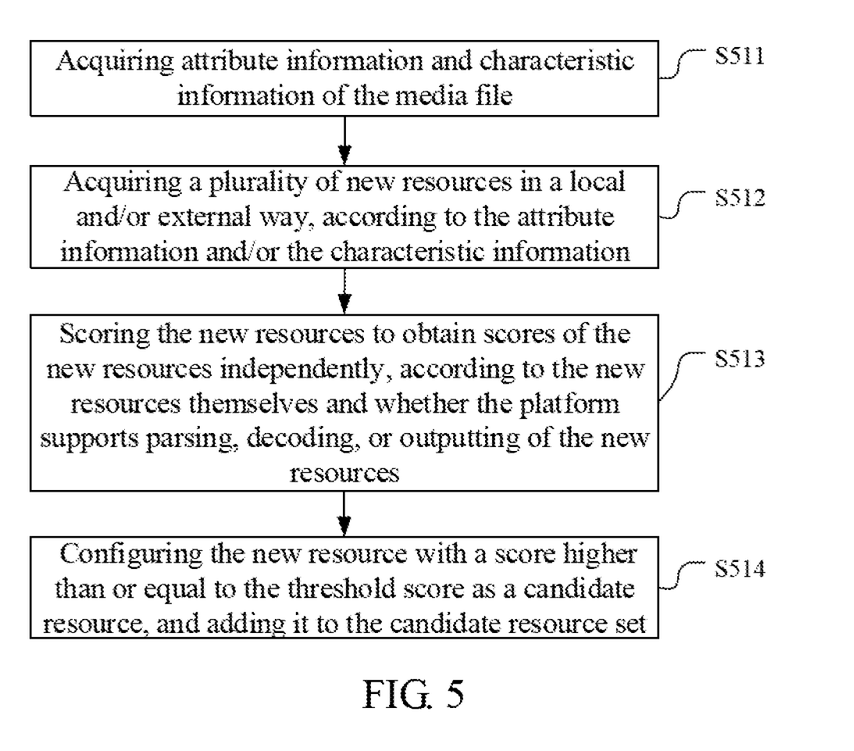
FIG. 5 is a flowchart of a method for playing a media file in accordance with a fourth embodiment of the present disclosure.

As shown in FIG. 5, FIG. 5 is a flow chart of a method for playing a media file according to a fourth embodiment of the present disclosure. On the basis of the method for playing a media file in the foregoing embodiments, the performing of resource-detection process includes actions/operations in the following blocks.

At block S511, the method includes acquiring attribute information and characteristic information of the media file.

The attribute information of the media file may include a name of the media file and a path of the media file. The characteristic information of the media file may include data at a plurality of specific locations after the media file is decoded. For example, data at a at a plurality of specific locations of the media file may be read first, then the data at a plurality of locations may be decoded, and characteristics of the decoded data may be extracted to be the characteristic information. For another example, the decoded data may be directly configured as the characteristic information.

At block S512, the method includes acquiring a plurality of new resources in a local and/or external way, according to the attribute information and/or the characteristic information.

The external way may refer to network and/or interconnect sharing, and the interconnect sharing includes local area sharing, specific protocol sharing, and specific server addresses, and the like. In one example, resources may be acquired in a specific order, for instance, in an order from local to external. In another example, new resources may be acquired directly from a specific location, such as acquiring new resources directly from a specific server address.

In one example, acquiring a new resource according to the attribute information may be performed by acquiring directly locally or externally according to the name of the media file. In another example, acquiring the new resource according to the attribute information and the characteristic information may be performed by firstly acquiring a plurality of resources locally or externally according to the name of the media file, then comparing similarities between the characteristic information of the acquired resource and the characteristic information of the media file, and regarding the resources satisfying specific conditions as the required new resources.

At block S513, the method includes scoring the plurality of new resources to obtain scores of the plurality of new resources independently, according to the new resources themselves and whether the platform supports parsing, decoding, or outputting of the new resources.

In one example, before scoring one resources, the method further includes: determining whether the platform supports encoding of the resource and whether the data of the resource is encapsulated in a specific package format; scoring the resource, when the platform supports the encoding of the resource and the data of the resource is encapsulated in a specific package format, otherwise, determining the score of the resource directly to be 0 and adding the resource to the candidate resource blacklist.

In one example, the scoring of the new resource includes: sequentially determining whether the new resources are parsed data and decoded data, obtaining the scores of the new resources according to whether the platform supports the decoding and outputting of the new resources, when the new resource is not parsed data; and obtaining the scores of the new resources according to whether the platform supports the outputting of the new resource, when the new resources are parsed and decoded data. Further, in one example, obtaining the scores of the new resources according to whether the platform supports decoding and outputting of new resources, includes following a step.

The method includes calculating the scores of the new resources according to the following formula.

$$S = s_i * \sum_{m=1}^{M} \left(K_m * \frac{q_m}{Q_m}\right)$$

Herein, S is the score of the new resource; $s_i$ is a coefficient for a data source and less than or equal to 1, with a sum of the coefficients of all the data sources to be 1; M is the number of resource parameters, and is greater than or equal to 1; $q_m$ is a value of the resource parameter, $Q_m$ is an upper limit of the resource parameter supported by the platform, and $K_m$ is a weight of the resource parameter, with a sum of the weights of all resource parameters to be 1, i.e., $1=\Sigma_{m=1}^{M}(K_m)$. The data source indicates a source of the resource, that is, the resource comes from the local or external. If the detection is performed from the local, network, and interconnect sharing, there are three data source coefficients, namely $s_1$, $s_2$, and $s_3$, respectively. The three coefficients are respectively configured to be values less than 1, with a sum of the three coefficients equal to 1. The resource parameters include sampling rate, frame rate, code rate, resolution, and so on. For example, when the resource is a video resource, the resource parameters include a frame rate, a code rate, and a resolution. For another example, when the resource is an audio resource, the resource parameter includes a sampling rate. For another example, when the resource is a subtitle resource, the resource parameters include encoding, language matching, and geographic location matching. In this case, the resource parameter may be a decoding parameter to decode the resource and an output device parameter to output the resource, such as a frame rate and a resolution. According to how the platform supporting the output of the new resource, obtaining the scores of the new resources includes, in one example, calculating the scores of the new resources according to the above formula. In this case, the resource parameter may merely be an output device parameter to output the new resource, for example, a resolution.

At block S514, the method includes configuring the new resource with a score higher than or equal to the threshold score to be a candidate resource, and adding it into the candidate resource set.

In one example, when the number of candidate resources in the candidate resource set is less than a predetermined value, and if the number of new resources with a score higher than or equal to the threshold score is greater than the number required in the candidate resource set, the new resources with the score higher than or equal to the threshold score are sequentially configured to be the candidate resource according to their scores from high to low, and are added to the candidate resource set until a current number of candidate resources in the candidate resource set reaches the predetermined value.

In one example, configuring the new resource with the score higher than or equal to the threshold score to be a candidate resource, includes establishing a candidate resource entry for the new resource with the score higher than or equal to the threshold score, wherein the candidate resource entry includes scoring information, path information, identification information, additional information, and file information. The scoring information is the score of the candidate resource. The path information is a path of a file to which the candidate resource belongs. The identification information is configured to identify a type of candidate resource, such as video, audio or subtitles. In one example, the identification information may be represented by a binary value, for example, 00 indicates that the type of the candidate resource is video, 01 indicates that the type of the candidate resource is audio, and 10 indicates that the type of the candidate resource is subtitle. The additional information includes a protocol and service description information configured to acquire the resource, and the service description information includes a maximum rate and supported operations such as whether to support requesting to expand the bandwidth, whether to support multi-path transmission, and the like. The file information may include a sampling rate, a code rate, and the like. That is to say, the format of each candidate resource in the candidate resource set is scoring information, path information, identification information, additional information, and file information.

Figure 6:
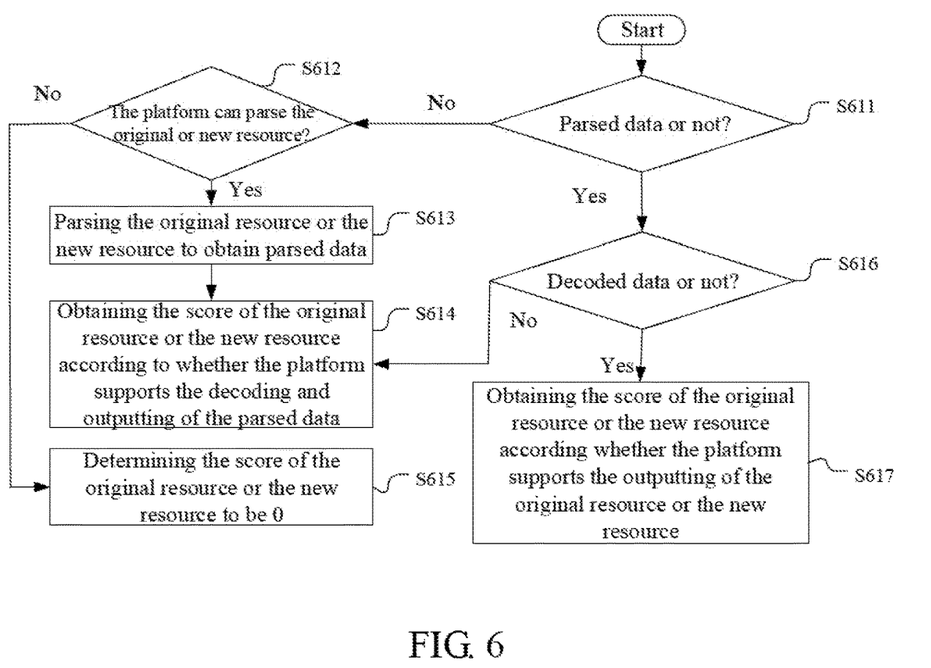
FIG. 6 is a flow chart of a method for playing a media file in accordance with a fifth embodiment of the present disclosure.

As shown in FIG. 6, FIG. 6 is a flow chart of a method for playing a media file according to a fifth embodiment of the present disclosure. On the basis of the method for playing a media file in the foregoing embodiments, the scoring of the original resource or the new resource includes actions/operations in the following blocks.

At block S611, the method includes determining whether the original resource or the new resource is parsed data or not.

If the original resource or the new resource is not the parsed data, block S612 is performed, and if the original resource or the new resource is the parsed data, block S616 is performed.

At block S612, the method includes determining whether the platform can parse the original resource or the new resource.

If the platform can parse the original resource or the new resource, block S613 is performed. If the platform cannot parse the original resource or the new resource, block S615 is performed.

At block S613, the method includes parsing the original resource or the new resource to obtain parsed data.

At block S614, the method includes obtaining the score of the original resource or the new resource according to whether the platform supports the decoding and outputting of the parsed data. Specifically, the score of the original resource or the new resource is obtained according to whether the platform supports the decoding and outputting, and the score of the original resource or the new resource may be calculated according to the following formula:

$$S = s_i * \sum_{m=1}^{M} \left( K_m * \frac{q_m}{Q_m} \right).$$

Herein, S is the score of the original resource or the new resource; $s_i$ is a coefficient for a data source and less than or equal to 1, with a sum of the coefficients of all data sources to be 1; M is the number of resource parameters, and is greater than or equal to 1; $q_m$ is the value of the resource parameter, $Q_m$ is an upper limit of the resource parameter supported by the platform, and $K_m$ is the weight of the resource parameter, with a sum of the weights of all resource parameters to be 1, i.e., $1=\Sigma_{m=1}^{M}(K_m)$. In this case, the resource parameter may be a decoding parameter to decode the original resource or the new resource, and an output device parameter to output the original resource or the new resource, such as, a frame rate and a resolution.

At block S615, the method includes determining the score of the original resource or the new resource to be 0.

At block S616, the method includes determining whether the original resource or the new resource is decoded data.

If the original resource or the new resource is the decoded data, block S617 is performed. If the original resource or the new resource is not the decoded data, block S614 is performed.

At block S617, the method includes obtaining the score of the original resource or the new resource according whether the platform supports the outputting of the original resource or the new resource. Specifically, obtaining the score of the original resource or the new resource according to whether the platform supports the outputting of the original resource or the new resource includes calculating the score of the original resource or the new resource according to the following formula:

$$S = s_i * \sum_{m=1}^{M} \left( K_m * \frac{q_m}{Q_m} \right).$$

Herein, S is the score of the original resource or the new resource; $s_i$ is the coefficient for the data source and less than or equal to 1, with a sum of the coefficients of all data sources to be 1; M is the number of resource parameters, and is greater than or equal to 1; $q_m$ is the value of the resource parameter, $Q_m$ is an upper limit of the resource parameter supported by the platform, and $K_m$ is the weight of the resource parameter, with a sum of the weights of all resource parameters to be 1, i.e., $1=\Sigma_{m=1}^{M}(K_m)$. In this case, the resource parameter may be an output device parameter to output the original resource or the new resource, for example, a resolution.

Figure 7:
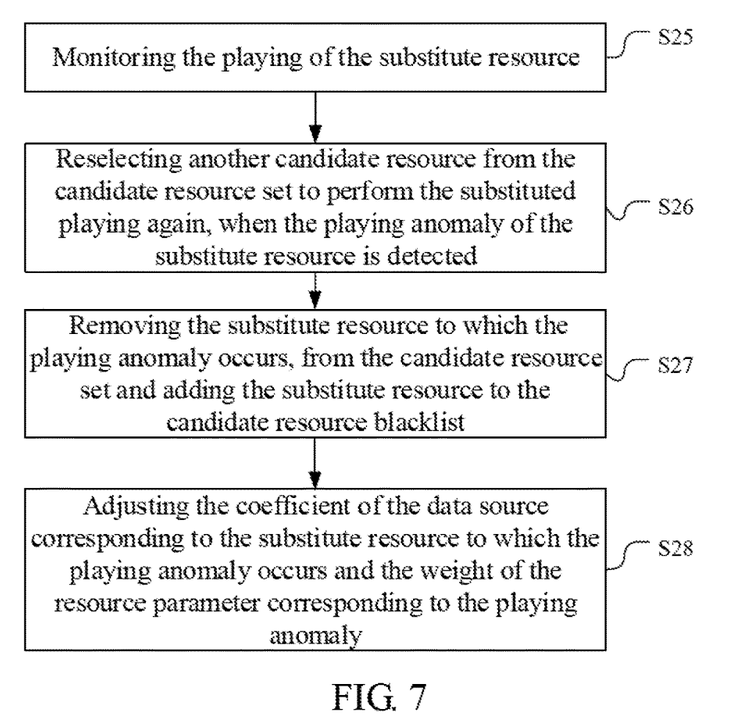
FIG. 7 is a flow chart of a method for playing a media file in accordance with a sixth embodiment of the present disclosure.

As shown in FIG. 7, FIG. 7 is a flow chart of a method for playing a media file according to a sixth embodiment of the present disclosure. On the basis of the method for playing a media file in the foregoing embodiments, the method further includes actions/operations in the following blocks.

At block S25, the method includes monitoring playing of the substitute resource.

Monitoring the playing of the substitute resource may be performed simultaneously with block S22.

At block S26, the method includes reselecting another candidate resource from the candidate resource set to perform the substituted playing again, when the playing anomaly occurring to the substitute resource is detected.

The playing anomaly includes any one of the following cases that a running error of the resource affects the playing, a processing error rate of the resource is greater than or equal to a predefined value, a data consumption rate fluctuation of the resource is greater than or equal to a predefined value, and a data output rate of the resource is inconsistent with a rate calculated according to a playing speed. Herein, the processing error rate of the resource is greater than or equal to the predefined value, indicating that there are many errors in the media file. The data consumption rate fluctuation of the resource is greater than or equal to the predefined value, indicating that the outputting is not smooth. If the data output rate of the resource is inconsistent with the rate calculated according to the playing speed when the outputting is smooth, it means that the playing is too slow or too fast.

At block S27, the method includes removing the substitute resource to which the playing anomaly occurs, from the candidate resource set and adding the substitute resource to a candidate resource blacklist.

Resources in the candidate resource blacklist are no longer adopted as substitute resources for substituted playing.

At block S28, the method includes adjusting the coefficient for the data source corresponding to the substitute resource in which the playing anomaly occurs and the weight of the resource parameter corresponding to the playing anomaly, so as to avoid detecting the new resource being the same or similar to the substitute resource to which the playing anomaly occurs when the resource-detection process is performed.

In one example, when the playing anomaly of the current candidate resource is monitored, the coefficient of the data source corresponding to the substitute resource in which the playing anomaly occurs and the weight of the resource parameter corresponding to the playing anomaly are adjusted. Specifically, the coefficient $s_i$ of the data source is appropriately lowered first, then the weight $K_m$ for the resource parameter corresponding to the playing anomaly is appropriately lowered, and the weight $K_m$ for the other resource parameters is appropriately increased to ensure that the sum of the weights $K_m$ for all the resource parameters is 1.

According to the present embodiment, by monitoring the playing of the current substitute resource, automatic switching to a valid substitute resource for substituted playing is achieved, and by adding the substitute resource in which the playing anomaly occurs to the candidate resource blacklist, repeated selection and monitoring are prevented.

Figure 8:
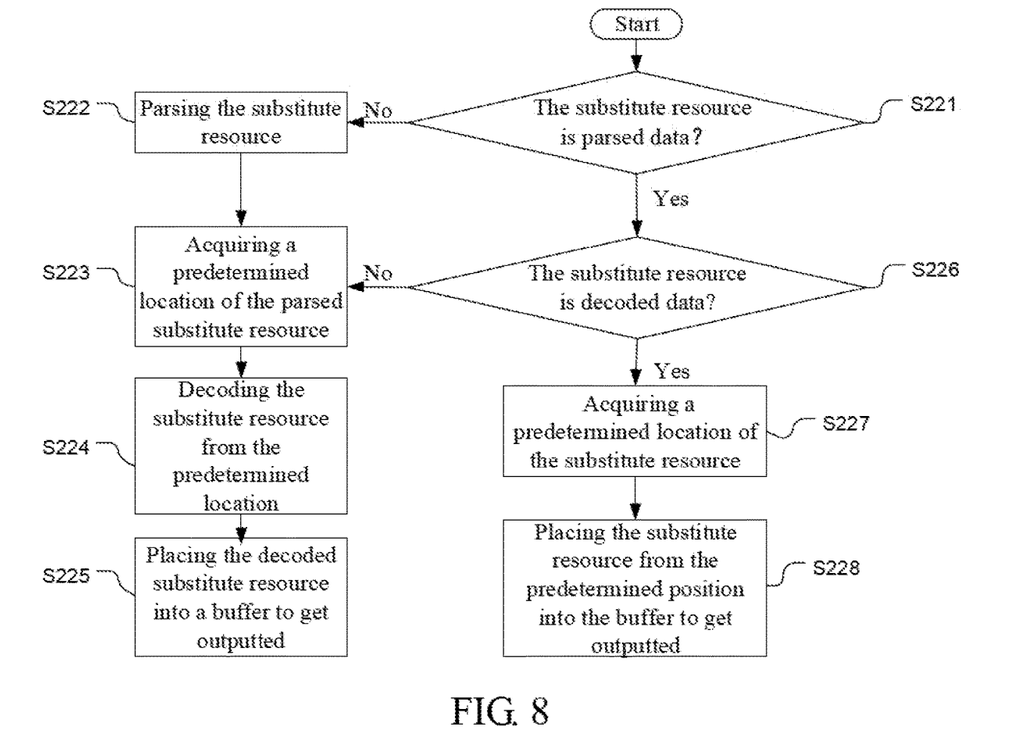
FIG. 8 is a flowchart of a method for playing a media file according to a seventh embodiment of the present disclosure.

As shown in FIG. 8, FIG. 8 is a flow chart of a method for playing a media file according to a seventh embodiment of the present disclosure. On the basis of the first embodiment of the method for playing a media file, replacing the original resource in the media file to play in block S22 further includes following blocks.

At block S221, the method includes determining whether the substitute resource is parsed data.

If the substitute resource selected from the candidate resource set is not the parsed data, the process turns to block S222; if not, the process turns to block S226.

At block S222, the method includes parsing the substitute resource.

At block S223, the method includes acquiring a predetermined location of the parsed substitute resource, wherein the predetermined location is located after a current playing location of the original resource, or is the current playing location of the original resource, or is a starting location of the original resource or the substitute resource. For example, in a scenario that the original resource is replaced by the substitute resource when playing a media file, if the original resource is still playing, the predetermined location is located after the current playing location of the original resource, and if the original resource is not playing, the predetermined location is the current playing location of the original resource. In the scenario that the original resource is replaced by the substitute resource before the media file is played, the predetermined location is the starting location of the original resource or the substitute resource.

At block S224, the method includes decoding the substitute resource from the predetermined location.

At block S225, the method includes placing the decoded substitute resource into a buffer to get outputted.

At block S226, the method includes determining whether the substitute resource is decoded data.

If the substitute resource is not the decoded data, the process turns to block S223, otherwise, the process turns to block S227.

At block S227, the method includes acquiring a predetermined location of the substitute resource, wherein, for the scenario of replacing performed after the playing, if the original resource is still playing, the predetermined location is after the current playing location of the original resource, otherwise, the predetermined location is the current playing location. For a scenario of replacing performed before the playing, the predetermined location is the starting position of the resource.

At block S228, the method includes placing the substitute resource from the predetermined position into the buffer to get outputted.

The performing order of the above blocks S222 and S226 is not necessarily to correspond to the above order. Block S226 may be performed first, and then block S222 is performed, or blocks S222 and S226 may be simultaneously performed.

Figure 9:
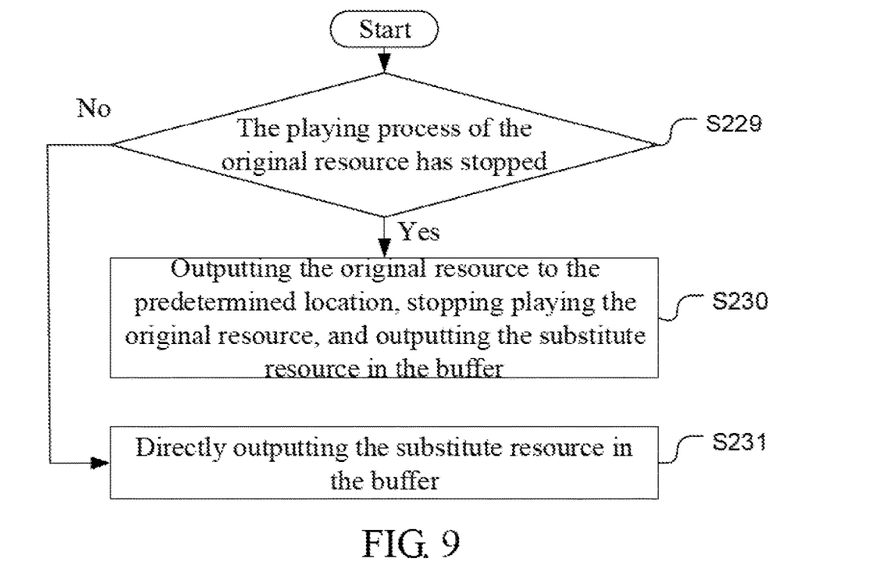
FIG. 9 is a flow chart of a method for playing a media file in accordance with an eighth embodiment of the present disclosure.

As shown in FIG. 9, FIG. 9 is a flow chart of a method for playing a media file according to an eighth embodiment of the present disclosure. On the basis of the seventh embodiment of the method for playing a media file, replacing the original resource in the media file to play in block S22 further includes following blocks.

At block S229, the method includes determining whether a playing process of the original resource is stopped.

In the processing flow of the playing, when any one of the parsing, decoding, synchronal controlling, and outputting of the original resource is stopped, it means that the playing process of the original video is stopped.

If the playing process of the original resource is not stopped, block S230 is performed. If the playing process of the original resource is stopped, block S231 is directly performed.

At block S230, the method includes outputting the original resource to the predetermined location, stopping playing the original resource, and outputting the substitute resource in the buffer. Outputting the original resource to the predetermined location means playing to the predetermined location by adopting the processing of FIG. 1, and then stopping the playing, that is, the original resource is no longer parsed, decoded, outputted, and the like.

At block S231, the method includes directly outputting the substitute resource in the buffer.

It should be noted that the playing states of audio resource and video resource are monitored independently. Before the substitute resource in the buffer is outputted, it is needed to synchronously control the substitute resource and resources of other paths in the media file. That is to say, the substitute resource replaces the role of the original resource, and there is also a synchronous controlling process during the playing, which is the same as the synchronous controlling in the normal processing flow of playing the media file, and will not be described in detail herein.

Figure 10:
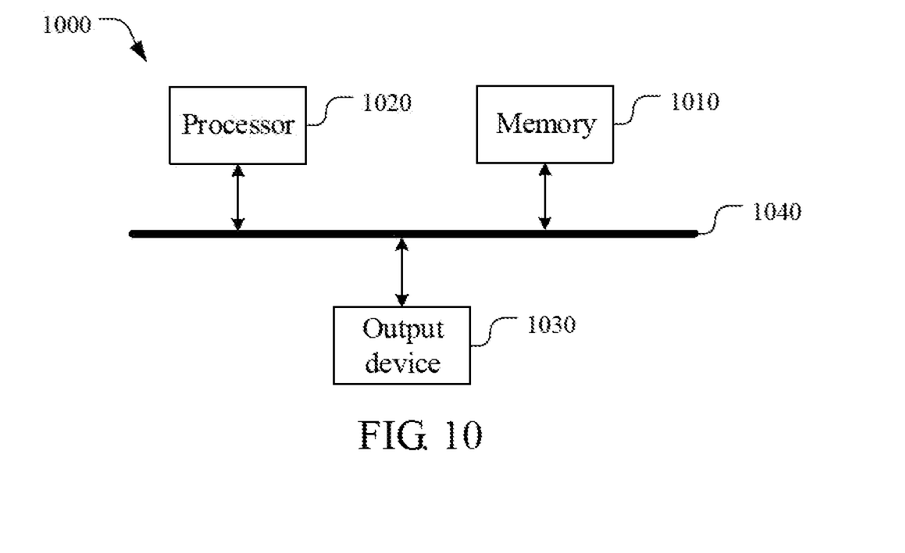
FIG. 10 is a schematic diagram of an apparatus for playing a media file according to an embodiment of the present disclosure.

As shown in FIG. 10, FIG. 10 is a schematic diagram of embodiment of a device for playing a media file according to the present disclosure. The device is applied in a terminal, and includes a memory 1010, a processor 1020, an output device 1030, and a bus 1040.

The memory 1010 can include read-only memory and random access memory, and provides instructions and data to processor 1020. A portion of the memory 1010 may also include NVRAM (non-volatile random access memory).

The memory 1010 stores following elements of: executable modules or data structures, or a subset thereof, or an extended set thereof: operation instructions, including various operation instructions configured to implement various operations; operating systems, including various systems programs configured to implement various basic services and handle hardware-based tasks.

The output device 1030 includes a display device such as a CRT (cathode ray tube) or a LCD (liquid crystal display), and the like, and a speaker or similar audio output device. In some embodiments, devices such as touch screens that are used as both input devices and output devices are also included.

In a specific application, components of the terminal are coupled together by a bus 1040. The bus 1040 may include a power bus, a control bus, a status signal bus, and the like, in addition to the data bus. However, for clarity of description, various buses are labeled as the bus 1040 in the figure.

In one embodiment, the processor 1020, in conjunction with the output device 1030, can perform the following operations by invoking instructions stored in the memory 1010.

The operations include determining whether resource-substitution process needs to be performed.

The operations include selecting a substitute resource from a candidate resource set to replace the original resource in the media file to play, when the resource-substitution process needs to be performed.

Specifically, in one embodiment, when the instruction is performed, the processor 1020 may perform operations of:

determining whether a predefined condition is satisfied; confirming that the resource-substitution process needs to be performed, when the predefined condition is satisfied. The predefined condition may include whether the score of the original resource is lower than a threshold score and/or whether the original resource involves a playing anomaly. The score of the original resource is achieved by scoring the original resource according to the original resource itself and whether the platform supports the parsing, decoding or outputting of the original resource. The playing anomaly includes any one of the following cases that a running error of the resource affects the playing, a processing error rate of the resource is greater than or equal to a predefined value, a data consumption rate fluctuation of the resource is greater than or equal to a predefined value, and a data output rate of the resource is inconsistent with a rate calculated according to a playing speed.

Specifically, in one embodiment, when the instruction is performed, the processor 1020 may further perform operations of: performing resource-detection process to establish the candidate resource set; and monitoring the candidate resource set, and performing resource-detection process when the number of candidate resources in the candidate resource set is less than a predetermined value, to update the candidate resource set.

Specifically, in one embodiment, when the instruction is performed, the processor 1020 may further perform operations of: acquiring attribute information and characteristic information of the media file; acquiring a plurality of new resources in a local and/or external way, according to the attribute information and/or the characteristic information; scoring the plurality of new resources to obtain scores of the plurality of new resources independently, according to the resources themselves and whether the platform supports parsing, decoding, or outputting of the resources; and configuring the new resource with a score higher than or equal to the threshold score as a candidate resource, and adding it to the candidate resource set.

Specifically, in one embodiment, when the instruction is performed, the processor 1020 may further perform operations of scoring of the original resource or the new resource, including: sequentially determining whether the original resource or the new resource is parsed data and decoded data; obtaining the score of the original resource or the new resource according to whether the platform supports the decoding and outputting of the original source and the new source, when the original resource or the new resource is not parsed data; and obtaining the score of the original resource or the new resource according to whether the platform supports the outputting of the original source and the new source, when the original resource or the new resource is parsed and decoded data.

Specifically, in one embodiment, obtaining the score of the original resource or the new resource according to whether the platform supports the decoding and outputting or according to whether the platform supports the outputting of the original resource or the new resource, includes calculating the score of the original resource or the new resource according to the following formula:

$$S = s_i * \sum_{m=1}^{M} \left( K_m * \frac{q_m}{Q_m} \right).$$

Herein, S is the score of the original resource or the new resource; $s_i$ is a coefficient for the data source and less than or equal to 1, with a sum of the coefficients of all data sources to be 1; M is the number of resource parameters, and is greater than or equal to 1; $q_m$ is the value of the resource parameter, $Q_m$ is an upper limit of the resource parameter supported by the platform, and $K_m$ is the weight of the resource parameter, with a sum of the weights of all resource parameters to be 1.

Specifically, in one embodiment, when the instruction is performed, the processor 1020 may further perform operations of: monitoring the playing of the substitute resource; reselecting another candidate resource from the candidate resource set to perform the substituted playing again, when the playing anomaly of the substitute resource is detected; removing the substitute resource, in which the playing anomaly occurs, from the candidate resource set and adding the substitute resource to the candidate resource blacklist; and adjusting the coefficient for the data source corresponding to the substitute resource in which the playing anomaly occurs and the weight of the resource parameter corresponding to the playing anomaly, so as to avoid detecting the new resource being the same or similar to the substitute resource to which the playing anomaly occurs when the resource-detection process is performed.

Specifically, in one embodiment, when the instruction is performed, the processor 1020 may further perform operations of: when the instruction is performed, sequentially determining whether the substitute resource is parsed data and decoded data; when the substitute resource is parsed data and decoded data, acquiring a predetermined location of the substitute resource, and placing the substitute resource into the buffer to be outputted from the predetermined location; wherein the predetermined location is after a current playing location of the original resource, or is the current playing location of the original resource, or a starting location of the original resource or substitute resource.

Specifically, in an embodiment, when the instruction is performed, the processor 1020 may further perform: determining whether the playing process of the original resource is stopped; when the playing process of the original resource is not stopped, outputting the original resource to the predetermined location, stopping playing the original resource, and outputting, by the output device 1030, the substitute resource in the buffer; and when the playing process of the original resource is stopped, directly outputting the substitute resource in the buffer, through the output device 1030.

For a detailed description of the functions of the respective components in the device for playing a media file according to the present embodiment, please refer to the related description of the corresponding embodiment of the above-described method of playing a media file.

The method disclosed in the foregoing embodiments of the present disclosure may be applied to the processor 1020 or implemented by the processor 1020. The processor 1020 may be an integrated circuit chip with an ability to process signals. In the implementation process, each step of the above method may be completed by an integrated logic circuit of hardware in the processor 1020 or an instruction in a form of software. The processor 1020 described above may be a common processor, a DSP (Digital Signal Processor), an ASIC (Application Specific Integrated Circuit), a FPGA (Field Programmable Gate Array) or another programmable logical device, a discrete gate or transistor logic component, a discrete hardware component. The methods, steps, and logical block diagrams disclosed in the embodiments of the present disclosure may be implemented or performed. The common processor may be a microprocessor or also be any one of conventional processors, etc. The steps of the method disclosed in the embodiments of the present disclosure may be directly implemented by the hardware decoding processor, or may be performed by a combination of hardware and software modules in the decoding processor. The software module can be located in a conventional storage medium such as random access memory, flash memory, read only memory, programmable read only memory or electrically erasable programmable memory, registers, and the like. The storage medium is located in the memory 1010, and the processor 1020 reads the information in the memory 1010 and completes the steps of the above method in combination with its hardware.

It will be known to those skilled in the art that many modifications and variations can be made in the device and method while the teachings of the invention are disclosed. Accordingly, the above disclosure should be considered as limited only by the scope of the appended claims.

What is claimed is:

1. A method for playing a media file, performed by a terminal, wherein the terminal comprises a processor, a memory and an output device, the memory provides instructions and data to the processor, and the processor is configured to perform following operations cooperatively with the output device:
determining whether a predefined condition is satisfied, wherein the predefined condition being satisfied indicates that a resource-substitution process needs to be performed, and the preset condition comprises whether a score of an original resource in the media file being lower than a threshold score and whether a playing anomaly occurs to the original resource;
selecting a substitute resource from a candidate resource set to replace the original resource in the media file to play, when the resource-substitution process needs to be performed;
wherein a score of a new resource or the score of the original resource is calculated according to a following formula:

$$S = s_i * \sum_{m=1}^{M} \left( K_m * \frac{q_m}{Q_m} \right)$$

wherein, S is the score of the original resource or the respective new resource; $s_i$ is a coefficient for a data source and less than or equal to 1, with a sum of the coefficients for all the data sources to be 1; M is the number of resource parameters, and is greater than or equal to 1; $q_m$ is a value of the resource parameter, $Q_m$ is an upper limit of the resource parameter supported by a playing platform, and $K_m$ is a weight of the resource parameter, with a sum of the weights of all resource parameters to be 1; and
a candidate resource set is established and comprises the new resource having a score higher than or equal to the threshold score,
wherein the method further comprises:
performing a resource-detection process to establish the candidate resource set; and
monitoring the candidate resource set, and performing the resource-detection process when the number of candidate resources in the candidate resource set is less than a predetermined value, to update the candidate resource set;
wherein the performing the resource-detection process comprises:
acquiring attribute information and characteristic information of the media file;
acquiring a plurality of new resources in a local and/or external way, according to the attribute information and/or the characteristic information;
scoring the plurality of new resources to obtain scores of the plurality of new resources independently, according to the new resources themselves and according to whether parsing, decoding, or outputting of the new resources is supported by the platform; and
configuring a respective new resource of the new resources with a score higher than or equal to a threshold score to be a candidate resource, and adding the candidate resource into the candidate resource set.

2. The method according to claim 1, wherein the scoring the original resource or the respective new resource comprises:
sequentially determining whether the original resource or the respective new resource is parsed data and decoded data;
obtaining the score of the original resource or the new resource according to whether decoding and outputting of the original source or the respective new source are supported by the platform, when the original resource or the respective new resource is not the parsed data; and
obtaining the score of the original resource or the respective new resource according to whether the outputting of the original source or the respective new source is supported by the platform, when the original resource or the respective new resource is the parsed and decoded data.

3. The method according to claim 1, further comprising:
monitoring a playing process of the substitute resource;
reselecting another candidate resource from the candidate resource set to perform another resource-substitution process, when the playing anomaly occurring to the substitute resource is detected; and
removing the substitute resource to which the playing anomaly occurs from the candidate resource set and adding the substitute resource to a candidate resource blacklist;
adjusting the coefficient for the data source corresponding to the substitute resource to which the playing anomaly occurs and the weight of the resource parameter corresponding to the playing anomaly, to avoid detecting any one of the new resources being same or similar to the substitute resource to which the playing anomaly occurs when the resource-detection process is performed.

4. The method according to claim 1, wherein the replacing the original resource in the media file to play comprises:
sequentially determining whether the substitute resource is parsed data and decoded data;
acquiring a predetermined location of the substitute resource, and placing the substitute resource into a buffer to be outputted from the predetermined location, when the substitute resource is the parsed data and decoded data;
wherein the predetermined location is after a current playing location of the original resource, or is a current playing location of the original resource, or a starting location of the original resource or substitute resource.

5. The method according to claim 4, wherein the replacing the original resource in the media file to play further comprises:
    determining whether a playing process of the original resource is stopped;
    outputting the original resource to the predetermined location, stopping playing the original resource, and outputting the substitute resource in the buffer, when the playing process of the original resource is not stopped; and
    directly outputting the substitute resource in the buffer, when the playing process of the original resource is stopped.

6. The method according to claim 1, wherein whether the resource-substitution process needs to be performed is determined during the media file being played or before the media file is played.

7. The method according to claim 1, wherein before the scoring the plurality of new resources, further comprises:
    determining whether encoding of the respective new resource is supported and whether data for the respective new resource is encapsulated in a specific package format;
    scoring the respective new resources when encoding of the respective new resource is supported and data for the respective new resource is encapsulated in the specific package format; and
    determining the score of the respective new resource directly to be 0 and adding the respective new resource to a candidate resource blacklist when the encoding of the respective new resource is not supported and/or the data for the respective new resource is not encapsulated in the specific package format.

8. The method according to claim 1, wherein the configuring the respective new resource with the score higher than or equal to the threshold score to be a candidate resource, comprises:
    establishing a candidate resource entry for the respective new resource with the score higher than or equal to the threshold score, wherein the candidate resource entry comprises scoring information, path information, identification information, additional information, and file information.

9. The method according to claim 1, wherein the playing anomaly comprises at least one of the following:
    a running error of a resource affecting a playing of the resource;
    a processing error rate of the resource being greater than or equal to a predefined value;
    a data consumption rate fluctuation of the resource being greater than or equal to a predefined value; and
    a data output rate of the resource being inconsistent with a rate calculated according to a playing speed.

10. An apparatus for playing a media file, comprising a processor in communication with a non-transitory memory and configured to execute computer programs stored in the non-transitory memory that cause the processor to:
    determine whether a predefined condition is satisfied, wherein the predefined condition being satisfied indicates that a resource-substitution process needs to be performed, and the preset condition comprises whether a score of an original resource in the media file being lower than a threshold score and whether a playing anomaly occurs to the original resource;
    select a substitute resource from a candidate resource set to replace the original resource in the media file to play, when the resource-substitution process needs to be performed;
    wherein a score of a new resource or the score of the original resource is calculated according to a following formula:

$$S = s_i * \sum_{m=1}^{M} \left( K_m * \frac{q_m}{Q_m} \right)$$

wherein, S is the score of the original resource or the respective new resource; $s_i$ is a coefficient for a data source and less than or equal to 1, with a sum of the coefficients for all the data sources to be 1; M is the number of resource parameters, and is greater than or equal to 1; $q_m$ is a value of the resource parameter, $Q_m$ is an upper limit of the resource parameter supported by a playing platform, and $K_m$ is a weight of the resource parameter, with a sum of the weights of all resource parameters to be 1; and
    a candidate resource set is established and comprises the new resource having a score higher than or equal to the threshold score,
    wherein the processor is further caused to:
    perform a resource-detection process to establish the candidate resource set; and
    monitor the candidate resource set, and perform the resource-detection process when the number of candidate resources in the candidate resource set is less than a predetermined value, to update the candidate resource set;
    wherein while performing the resource-detection process, the processor is further caused to:
    acquire attribute information and characteristic information of the media file;
    acquire a plurality of new resources in a local and/or external way according to the attribute information and/or the characteristic information;
    score the plurality of new resources to obtain scores of the plurality of new resources independently, according to the new resources themselves and according to whether parsing, decoding, or outputting of the new resources is supported by the platform; and
    configure a respective new resource of the new resources with a score higher than or equal to a threshold score to be a candidate resource, and add the candidate resource into the candidate resource set.

11. An apparatus for playing a media file, comprising a processor in communication with a non-transitory memory and configured to execute computer programs stored in the non-transitory memory that cause the processor to:
    determine whether a predefined condition is satisfied during the media file is played, wherein the predefined condition being satisfied indicates that a resource-substitution process needs to be performed, and the preset condition comprises whether a score of an original resource in the media file being lower than a threshold score and whether a playing anomaly occurs to the original resource;
    select a substitute resource from a candidate resource set to replace the original resource in the media file to play, when the resource-substitution process needs to be performed;

wherein a score of a new resource or the score of the original resource is calculated according to a following formula:

$$S = s_i * \sum_{m=1}^{M} \left( K_m * \frac{q_m}{Q_m} \right)$$

wherein, S is the score of the original resource or the respective new resource; $s_i$ is a coefficient for a data source and less than or equal to 1, with a sum of the coefficients for all the data sources to be 1; M is the number of resource parameters, and is greater than or equal to 1; $q_m$ is a value of the resource parameter, $Q_m$ is an upper limit of the resource parameter supported by a playing platform, and $K_m$ is a weight of the resource parameter, with a sum of the weights of all resource parameters to be 1; and a candidate resource set is established and comprises the new resource having a score higher than or equal to the threshold score, wherein the processor is further caused to:

perform a resource-detection process to establish the candidate resource set; and monitor the candidate resource set, and perform the resource-detection process when the number of candidate resources in the candidate resource set is less than a predetermined value, to update the candidate resource set;

wherein while performing the resource-detection process, the processor is further caused to:

acquire attribute information and characteristic information of the media file;

acquire a plurality of new resources in a local and/or external way, according to the attribute information and/or the characteristic information;

score the plurality of new resources to obtain scores of the plurality of new resources independently, according to the new resources themselves and according to whether parsing, decoding, or outputting of the new resources is supported by the platform; and configure a respective new resource of the new resources with a score higher than or equal to a threshold score to be a candidate resource, and add the candidate resource into the candidate resource set.

12. The apparatus according to claim 11, wherein the score of the original resource is obtained by scoring the original resource based on the original resource itself and based on whether parsing, decoding, or outputting of the original resource is supported by the platform.

* * * * *